United States Patent [19]
Cunningham, Jr. et al.

[11] Patent Number: 5,548,970
[45] Date of Patent: Aug. 27, 1996

[54] AIR HANDLING SYSTEM

[75] Inventors: Robert A. Cunningham, Jr., Argyle; Phillip R. Rutledge, Farmers Branch, both of Tex.

[73] Assignee: NRG Industries Inc., Carrollton, Tex.

[21] Appl. No.: 410,233

[22] Filed: Mar. 24, 1995

[51] Int. Cl.⁶ .................................................. F25D 23/00
[52] U.S. Cl. ................................. 62/271; 165/8
[58] Field of Search .................................. 62/271, 238.6, 62/326, 259.1; 165/6, 8

[56] References Cited

U.S. PATENT DOCUMENTS

| | | | |
|---|---|---|---|
| 3,861,459 | 1/1975 | Koop | 165/62 |
| 4,100,763 | 7/1978 | Brody | 62/238.6 |
| 4,719,761 | 1/1988 | Cromer | 62/94 |
| 4,952,283 | 8/1990 | Besik | 165/4 |
| 5,348,077 | 9/1994 | Hillman | 165/16 |
| 5,423,187 | 6/1995 | Fournier | 62/94 |

*Primary Examiner*—William Doerrler
*Attorney, Agent, or Firm*—M. H. Gay

[57] ABSTRACT

Air handling system including a heat recovery means including blowers and dampers for controlling air flow and a desiccant wheel movable into and out of the air stream to selectively recover heat from exhaust air and transfer it to outside air. The air handlling system may also include an air conditioning system and an economizer including dampers to control recirculated air and inlet and exhaust air.

2 Claims, 4 Drawing Sheets

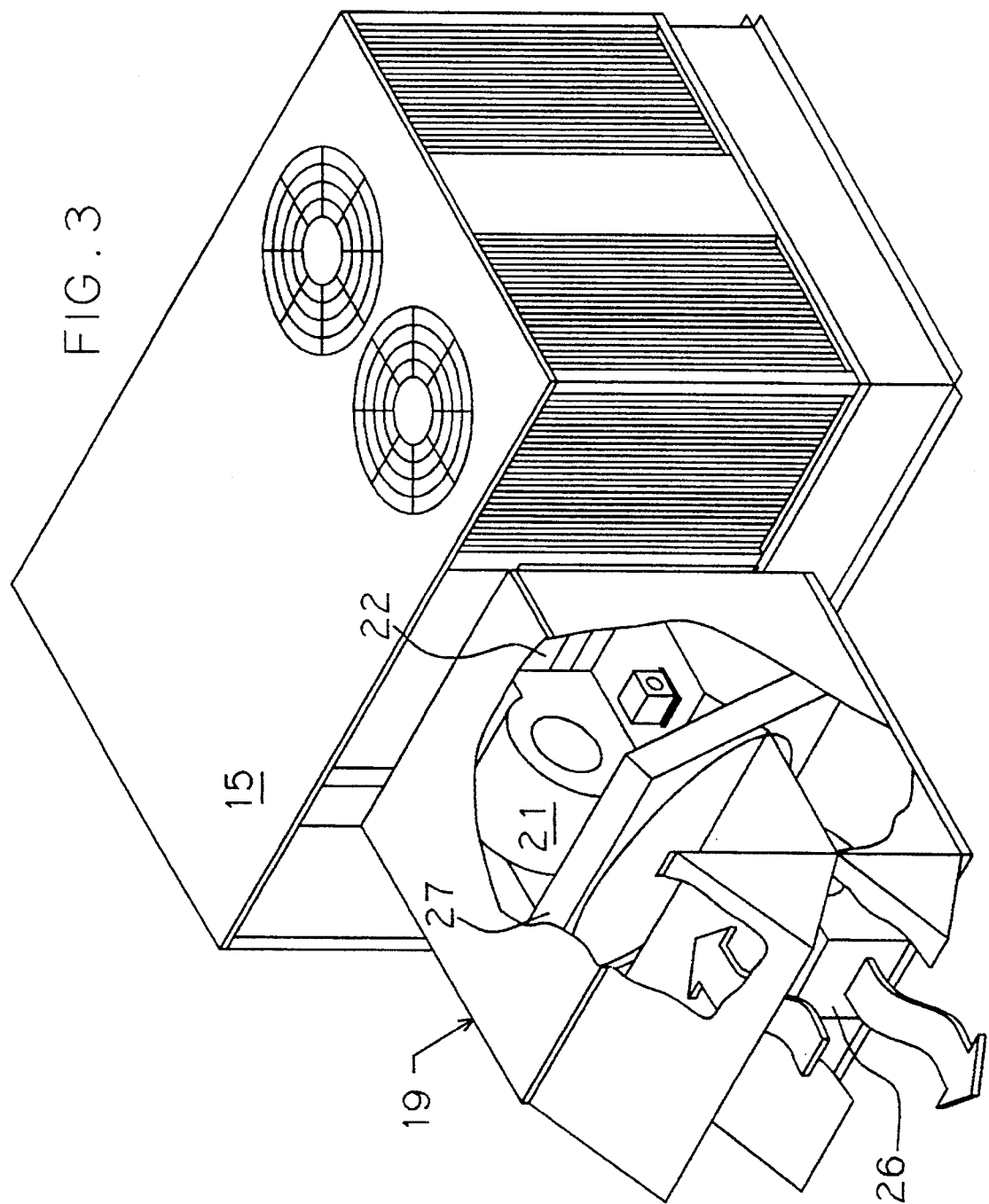

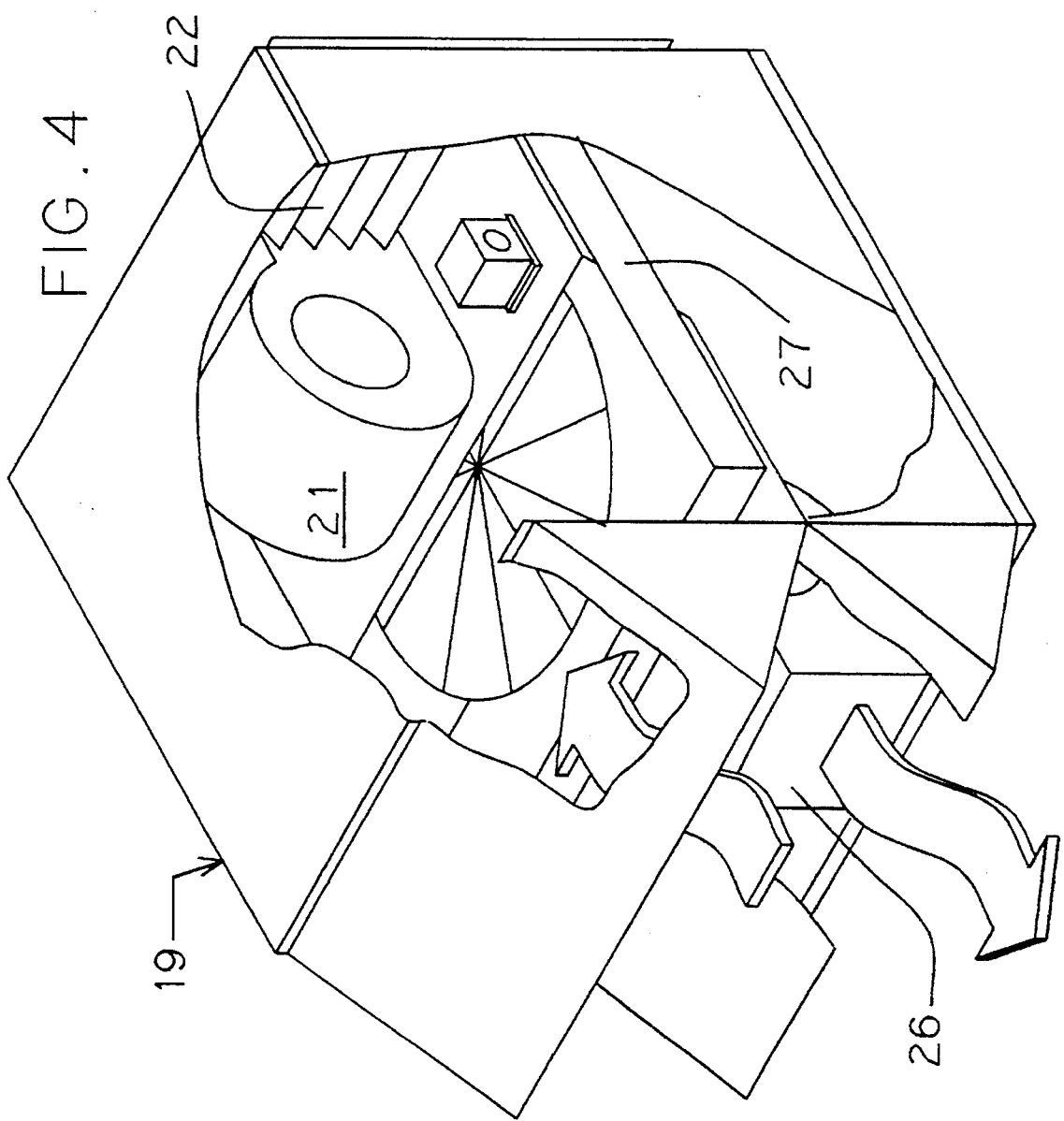

ABSTRACT # AIR HANDLING SYSTEM

This invention relates to air handling systems and more particularly to systems including an economizer system and a heat recovery system in which the heat recovery system is selectively employed when heat transfer to or from exhaust air and/or inlet air is desired and is inoperative and does not interfere with air flow when heat recovery is not desired. The term "heat recovery" is used herein in its broadest sense to mean transfer of heat between outside and exhaust air.

Both economizers and heat recovery systems such as desiccant wheels are old and well known as separate systems. They have never been utilized together. A system design has incorporated either an economizer or a heat recovery unit, but not both because the economizer must be able to deliver 100% outside air to the system, and the recovery units designed to do the same would be prohibitively large and far too expensive.

New ASHRAE standards are requiring buildings to bring in more and more outside air. In some applications the standards may require as much as 40% to 50% outside air.

This invention permits combining an economizer and heat recovery system for the first time in an economical design.

An object of this invention is to permit the combination of an economizer and heat recovery system in an economical design.

Another object is to provide a combination economizer and heat recovery system in which the heat recovery means is selectively positioned in and removed from the flow stream of the inlet and exhaust air.

Another object is to provide a heat recovery system employing a desiccant wheel in which the wheel is selectively moved into and out of the inlet and exhaust air flow so that the economizer may function in the conventional manner when the wheel is moved to an out-of-the-way position.

Other objects, features and advantages of this invention will be apparent from the drawings, specification and claims.

In the drawings wherein an illustrative apparatus is shown:

FIG. 3 is a perspective view of an air handling system in accordance with this invention with parts broken away to illustrate the desiccant wheel positioned in the inlet and exhaust air flowways; and FIG. 4 is a view similar the FIG. 3 of the heat recovery means with the wheel shown in an out-of-the-way position permitting free flow of inlet and exhaust air.

Figure 1:
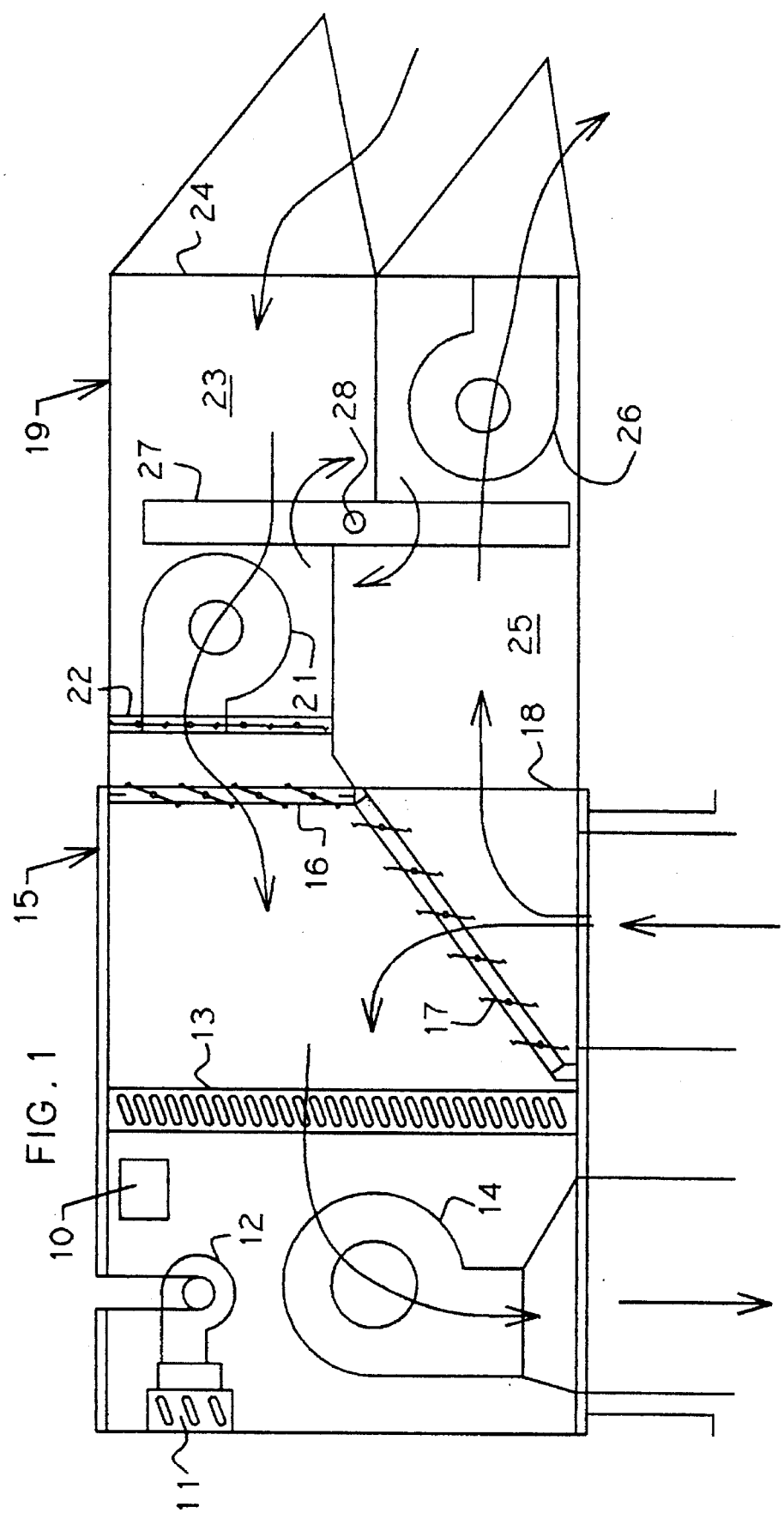
FIG. 1 is a schematic view showing the combination economizer and heat recovery means with a desiccant wheel shown selectively positioned in the flowway for incoming and exhaust air.

FIG. 1 illustrates the system operating with partial return air and partial fresh outside air. The system includes the conventional air conditioning components such as the compressor 10, the condenser 11, condenser blower 12, evaporator 13, blower 14 for circulating air through the building and across the evaporator or cooling coil. These elements are set up and connected in the conventional manner (not shown) to cool and circulate air. This system may also be operated in a reversing mode commonly referred to as a heat pump.

The system includes a conventional economizer indicated generally at the area designated as 15 which includes dampers 16 and 17 which may be partially or fully opened or closed to control air flow. Inlet air is admitted through damper 16 and recirculated air through damper 17. Outlet 18 provides for exhaust air from the economizer.

A heat recovery unit is shown generally at 19. The unit includes inlet blower 21 with dampers 22 positioned horizontally to either side of the blower 21. The blower 21 and dampers 22 communicate with the inlet dampers 16 of the economizer 15 and inlet air from the blower 21 pass through dampers 16 and feed into the inlet air chamber. Inlet air is drawn into the flowway 23 of the heat recovery unit through inlet 24. Outlet air from the conditioned space passes through economizer outlet 18 into flowway 25 of the heat recovery unit. Outlet air is drawn from flowway 25 and exhausted to the exterior by outlet blower 26.

In accordance with this invention the heat recovery means is selectively positioned in and removed from the flow of exhaust air and outside air. Preferably the heat recovery means is a desiccant wheel 27 which in its FIG. 1 position rotates about its central axis in the path of exhaust air and inlet air. In the conventional manner heat is transferred between these two air streams. To provide for selectively transferring heat the wheel 27 is mounted for movement into and out of the path of these two air streams. Preferably the wheel is mounted for rotation about a diameter line passing through the wheel. This rotation is provided by journal on opposite sides of the wheel which support the wheel in the heat recovery unit. One of these journals is shown at 28 in FIGS. 1 & 2. An identical journal is provided on the other side of the wheel to provide for rotation between the FIGS. 1 and 2 positions.

Figure 2:
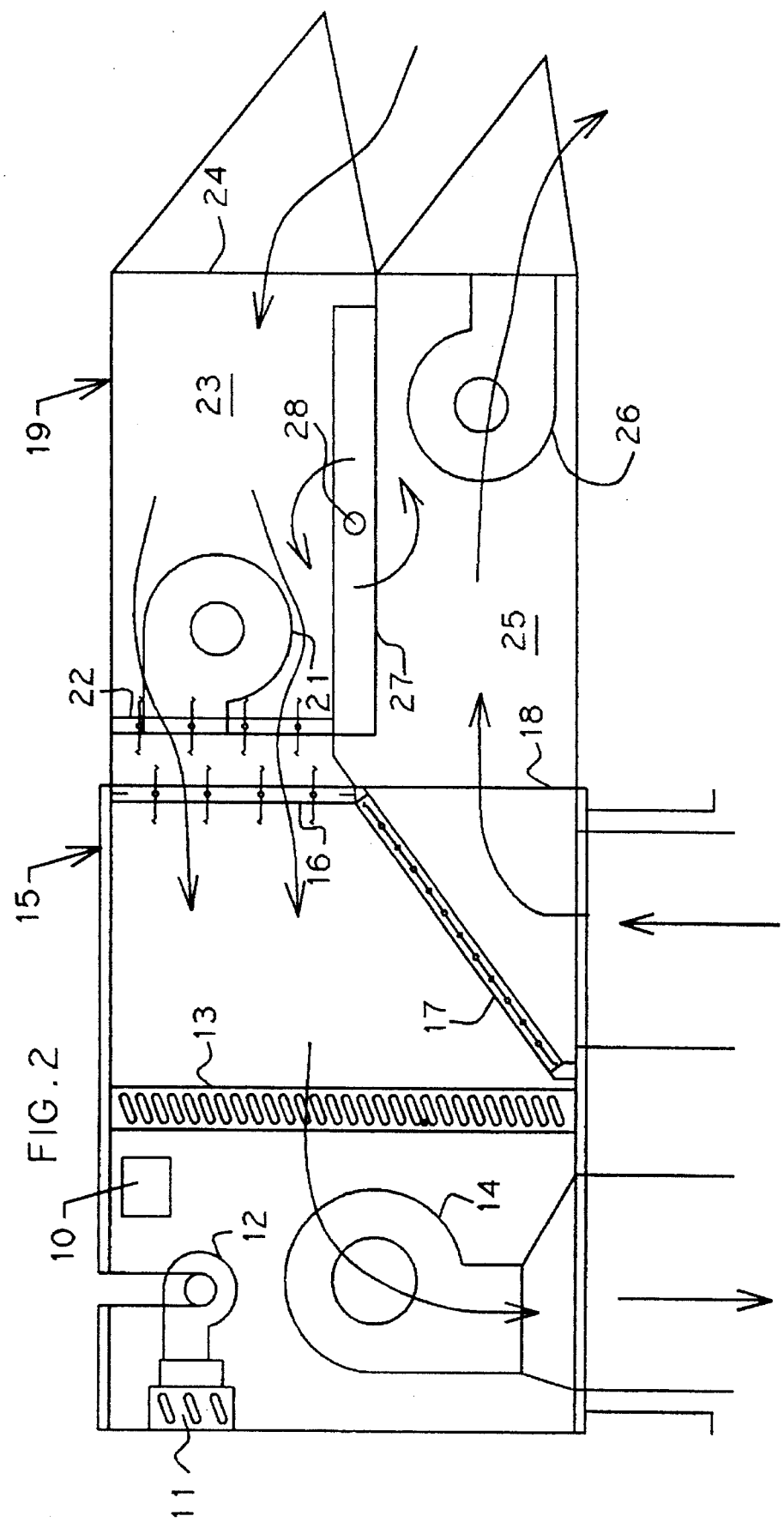
FIG. 2 is a view similar to FIG. 1 with the wheel shown in an out-of-the-way position permitting free flow of incoming and exhaust air.

FIG. 2 shows the system operating with the wheel 27 in the out-of-the-way position. Thus the economizer is operable and the heat recovery system is not operable. For instance with damper 17 closed and dampers 16 and 22 open the blower 14 may move 10000 C.F.M of air through the system. Both blowers 21 and 26 may be bypassed if desired, or blower 26 may be used as a means of power exhaust from the space.

FIG. 1. shows the economizer and heat recovery system in operation. Again the blower 14 may be moving 10000 C.F.M of air through the system. The wheel is in operative position to reclaim heat. The inlet air blower 21 may be set to introduce various quantities of air, say 2000 C.F.M. into the system with the dampers 22 closed. The outlet blower may be set to exhaust the same quantity, in this case 2000 C.F.M. of air from the system. With this arrangement 8000 C.F.M. of air will pass through economizer damper 17.

If desired the economizer inlet damper 16 and heat recovery inlet damper 22 may be combined in a single damper.

The foregoing disclosure and description of the invention are illustrative and explanatory thereof and various changes in the method and apparatus and system and in the size, shape and materials, as well as in the details of the illustrated construction, may be made within the scope of the claims without departing from the spirit of the invention.

What is claimed is:

1. An air handling system comprising:

air conditioning means including compressor means, condenser means, cooling coil means and blower means for moving air through the cooling coil means and condenser means to condition air;

economizer means including a first damper means controlling recirculation and exhaust of air from the air conditioning means and a second damper means controlling admission of inlet air to the cooling coil means;

in combination with:

heat recovery means including inlet blower means for selectively introducing outside air to the air conditioning means, third damper means controlling flow of outside air to the air conditioning means other than through said inlet blower means, outlet blower means controlling flow of exhaust air from the air conditioning means, and desiccant wheel means which in one position rotates in the flow of outside and exhaust air and in another position is in an out-of-the-way position permitting free flow of outside and exhaust air for selectively recovering heat from the exhaust air and transferring the recovered heat to said outside air.

2. An air handling system comprising:

heat recovery means including inlet blower means for selectively introducing outside air to the system, damper means controlling flow of outside air to the system other than through said inlet blower means, outlet blower means controlling flow of exhaust air from the system, and desiccant wheel means which in one position rotates in the flow of outside and exhaust air and in another position is in an out-of-the-way position permitting free flow of outside and exhaust air for selectively recovering heat from the exhaust air and transferring the recovered heat to said outside air.

* * * * *